United States Patent
Liebsch

(10) Patent No.: US 8,369,291 B2
(45) Date of Patent: Feb. 5, 2013

(54) METHOD FOR CONTROLLING COMMUNICATION WITH MOBILE STATIONS WITHIN A NETWORK BY IMPLEMENTING AT LEAST ONE FUNCTIONAL ENTITY IN THE NETWORK

(75) Inventor: Marco Liebsch, Heidelberg (DE)

(73) Assignee: NEC Corporation, Tokyo (JP)

( * ) Notice: Subject to any disclaimer, the term of this patent is extended or adjusted under 35 U.S.C. 154(b) by 26 days.

(21) Appl. No.: 11/252,579

(22) Filed: Oct. 19, 2005

(65) Prior Publication Data

US 2006/0088019 A1   Apr. 27, 2006

(30) Foreign Application Priority Data

Oct. 27, 2004  (DE) .......................... 10 2004 052 331

(51) Int. Cl.
*H04W 4/00* (2009.01)
*G08C 17/00* (2006.01)

(52) U.S. Cl. ...................... 370/338; 370/311

(58) Field of Classification Search .................. 370/311, 370/338, 331, 389, 328, 401; 455/418, 422.1, 455/456.1, 436
See application file for complete search history.

(56) References Cited

U.S. PATENT DOCUMENTS

| | | | |
|---|---|---|---|
| 5,636,220 | A | 6/1997 | Vook et al. |
| 7,236,470 | B1 * | 6/2007 | Bims ............................ 370/328 |
| 7,689,225 | B2 | 3/2010 | Funato et al. |
| 2003/0145092 | A1 | 7/2003 | Funato et al. |
| 2004/0176086 | A1 * | 9/2004 | Chatterjee et al. ............ 455/418 |
| 2004/0205233 | A1 * | 10/2004 | Dunk ............................ 709/238 |
| 2004/0259542 | A1 * | 12/2004 | Viitamaki et al. .......... 455/426.2 |
| 2006/0155860 | A1 | 7/2006 | Funato et al. |
| 2007/0233863 | A1 | 10/2007 | Funato et al. |

FOREIGN PATENT DOCUMENTS

| | | |
|---|---|---|
| JP | 11-313370 | 11/1999 |
| JP | 2001-168879 | 6/2001 |
| JP | 2001-258058 | 9/2001 |
| JP | 2004-514383 | 5/2004 |
| JP | 2004-180115 | 6/2004 |
| JP | 2005-516509 | 6/2005 |
| WO | WO 03/088703 | * 10/2003 |
| WO | WO 03/088703 A1 | 10/2003 |

OTHER PUBLICATIONS

Hung-Huang Liu and Jean-Lien C. Wu, "Packet Telephony Support for the IEEE 802.11 wireless LAN", IEEE Communications Letters, vol. 4, No. 9, Sep. 2000.

Japanese Office Action issued Dec. 2, 2010 in corresponding Japanese Application No. 2005-240582 with English translation of enclosed wavy lined portion.

* cited by examiner

*Primary Examiner* — Michael Faragalla
(74) *Attorney, Agent, or Firm* — Young & Thompson

(57) ABSTRACT

A method for controlling the communication with mobile stations within a network, preferably a WLAN (Wireless Local Area Network) according to the IEEE802.11 standard, wherein the network comprises at least one access point through which the stations are associated with the network and wherein the stations can enter a power save mode is—with regard to a flexible utilization especially in large networks and with regard to a reduction of the required complexity of the access point of the network—characterized in that at least one functional entity is implemented in the network by which at least one part of the functionality required in power save mode is controlled.

19 Claims, 3 Drawing Sheets

METHOD FOR CONTROLLING COMMUNICATION WITH MOBILE STATIONS WITHIN A NETWORK BY IMPLEMENTING AT LEAST ONE FUNCTIONAL ENTITY IN THE NETWORK

BACKGROUND OF THE INVENTION

1. Field of the Invention

The present invention relates to a method for controlling the communication with mobile stations within a network, preferably in a WLAN (Wireless Local Area Network) according to the IEEE802.11 standard, wherein the network comprises at least one access point via which the stations are associated with the network, and wherein the stations can enter a power save mode.

2. Description of the Related Art

The IEEE802.11 standard does not only represent a widely accepted access technology to wireless local area networks (WLANs), but moreover, it is taken into consideration as hot-spot access technology to the Internet within cellular 3GPP systems or as access technology to the IP-multimedia subsystem (IMS). In order to ensure wider area coverage granting access to an infrastructure based on the IEEE802.11 standard as well, there is a need for efficient mechanisms to reduce the power consumption of mobile devices on the one hand, and routing states have to be maintained efficiently in the network in order to support the reachability of the mobile devices on the other hand.

The IEEE802.11 standard specifies fundamental mechanisms to support the network interface card (NIC) of mobile stations if they have entered a power save mode (PSM). Furthermore, the IEEE802.11 standard allows indication of data traffic as well as forwarding IP data packets that come in to IEEE802.11 access points (AP) to mobile devices having entered the PSM. The relevant configurations necessary are made during the association process between a mobile device and an IEEE802.11 access point. In this case, the mobile device informs the access point about the parameter regarding its Listen Interval (LI) and in exchange the access point assigns an association identifier (AID) to the mobile device. The full control of a mobile station in PSM is hence collocated with the access point, i.e. the access point maintains the state of the mobile station, buffers IP data packets destined to the mobile station in power save mode, and notifies the mobile station by a so-called Traffic Indication Bitmap (TIM) that packets are available and can be polled from the access point, i.e. can be taken from there. Finally, the access point forwards the buffered data packets to the respective stations when the station requests the packets by means of an IEEE802.11-specific signaling message (a so-called power save poll, PSP) packet by packet.

According to the above captioned description, the known method of controlling the communication with a mobile station in power save mode turns out to be disadvantageous in two ways. Due to the fact that the full control of a mobile station in power save mode is taken over by the access point with which the mobile station is associated, the above mentioned configuration, i.e. especially the AID assigned to the station by the access point, is only valid as long as the mobile station is associated with the access point. In a larger network with several access points, the configuration has to be renewed whenever the station associates with a new access point. This re-configuration involves additional data traffic which has especially bad impacts on the power consumption of the mobile station.

A further basic disadvantage must be seen in the enormous complexity access points have to show in order to be able to take over the full control of mobile stations in PSM. The complexity may be appropriate for utilization in LANs in order to make specific functions that are specific for wireless technology transparent to the whole remaining network. Especially in larger (mobile) communication networks, a strict 1:1 association between a mobile station and an access point means a drastic restriction regarding flexibility, though.

SUMMARY OF THE INVENTION

An object of the present invention is to provide a method to control the communication with a mobile station within a network of the above captioned kind, which is especially applicable in larger networks with high flexibility and for which the necessary complexity of the access point of the network is reduced if compared to the known methods of the generic kind.

According to the invention, the present method is designed in such a way that at least one functional entity is implemented in the network by which at least a part of the functionality as required by the power save mode is controlled.

According to the invention, it has first been recognized that a significant relief of the access points in the network can be achieved by the functional entities which are implemented in the network, and by which at least a part of the functionality required in power save mode is controlled. The method according to the invention relocates individual functions to one or more functional entities which are separated from the access points, and hence enables a traffic indication controlled from the network for mobile stations in power save mode. The access points in the network can thus be equipped with a much lower complexity regarding the handling of IP user data packets destined to the stations as well as regarding the maintenance of related states.

Another advantage of the method according to the invention is that roaming, i.e. the change of a mobile station from one access point to another one can be performed with less activity of the mobile station. By assigning functionality to one or more functional entities in the network, specific parameters can be kept unaltered in the whole network; irrespective of the access point to which the mobile station is associated. Complex re-configurations having negative impacts on the in general very restricted energy resources of the station are dispensable when changing the access points.

In the framework of a concrete embodiment it can be provided that, by a functional entity, the stations are each assigned an identification which is valid irrespective of the corresponding access point in a part of the network or in the whole network. A part of the network can for example be formed by a paging area or a location area. As a principle, the identification is used in the same way as the above captioned AID in the IEEE802.11 standard, but it has a wider scope and it is not controlled by a single access point but by one of the functional entities that are implemented in the network. In order to indicate that the identification is not restricted to a single access point, the identification will in the following be referred to as network association ID and abbreviated as NAID.

The NAID is assigned to a mobile station before it enters the power save mode. This assignment can take place for example through a signaling, based on the Internet protocol, between the mobile station and a functional entity. In contrast to the above captioned standard-like AID which is assigned to a mobile station by a specific access point during the association procedure and which changes as soon as the station associates with another access point, the NAID has the big advantage that it can be kept even then when the station is in power save mode and changes the access point.

In an advantageous way the functionality as transferred to the functional entities can comprise the detection and/or the buffering of IP packets destined to the mobile station. This results in an additional possibility to reduce the complexity of the access point.

Furthermore, in an advantageous way the functional entities can take over the so-called mapping, i.e. the mapping of IP target addresses of IP data packets addressed to the stations to the respective network association IDs. In other words, the functional entities can manage an entry for the mobile station which comprises information about the IP address as well as information about the assigned NAID of the station.

In order to indicate to a mobile station in PSM that IP data packets destined for it are buffered in the network and can be forwarded to the station as soon as it is able to receive IP data traffic, the respective NAID of a station can be sent by a functional entity via a protocol, preferably via an IP-based signaling, to one or more access points in the network. Concretely, the network association ID can be sent for example to all the access points in the network. Alternatively, it can also be envisioned to send the network association ID only to access points within a certain part of the network (for example within a paging area, a location area etc.).

In the framework of a concrete implementation it can be provided that individual access points receiving the NAID of a mobile station, map the NAID to the corresponding bit in a Traffic Indication Map (TIM). In other words, the mapping function that maps the received NAID to the IEEE802.11-specific scheme to indicate data traffic, remains functionally with the individual access points. The TIM can—as it is also provided in the IEEE802.11 standard—be sent with subsequent beacons.

Regarding a further optimization of power save features of the mobile stations, it can be provided that a complete authentication and association of a station with an access point is performed only—and only then—when the station has been informed about available data traffic. By these means superfluous signaling as involved with authentication and association can efficiently be reduced.

In an advantageous way the functional entities can be assigned to control entities in the network which are responsible for the co-ordination of closely related functions. In particular, it is obviously beneficial to implement functional entities on an access router. An implementation can also be envisioned on a mobility agent performing the management and re-establishment of routing states of the mobile station within the network, or on a paging agent, which within a network usually takes over the localization and re-activation of mobile stations having reduced their signaling activities due to their power save mode. It should be noted that individual functionalities that are taken over by functional entities can be implemented on different network components.

The format of the association ID assigned to the mobile stations in the IEEE802.11 standard by the access points for identification is defined as default in that way that the AID can have values ranging from 1 to 2007. To avoid conflicts with the IEEE802.11 standard, it is advantageous within the framework of the present invention if the network association ID shows the same format as the AIDs according to the IEEE802.11 standard. By these means, an unambiguous identification of 2007 mobile stations in PSM is possible.

In case in larger networks with a multitude of access points within a location area to be controlled there are more than 2007 mobile stations in PSM, it can be provided in an advantageous way that a specific network association ID is assigned to more than one station. This only results in an indication of data traffic to more than one station. This ambiguity can easily be resolved, for example, by a protocol signaling between the mobile station and a functional entity, with the aid of the IP addresses of the stations or any other unambiguous identifier, and those stations to which data traffic has been indicated erroneously, can re-enter the power save mode immediately after the functional entity has resolved the ambiguity.

Now, there are several options of how to design and to further develop the teaching of the present invention in an advantageous way. For this purpose, it must be referred to the patent claims subordinate to patent claim 1 on the one hand and to the following explanation of the example of a preferred embodiment of the invention with the aid of the drawing on the other hand. In connection with the explanation of the preferred embodiment of the invention according to the drawing, the generally preferred designs and further developments of the teaching will be explained.

DESCRIPTION OF THE PREFERRED EMBODIMENT

Figure 1:
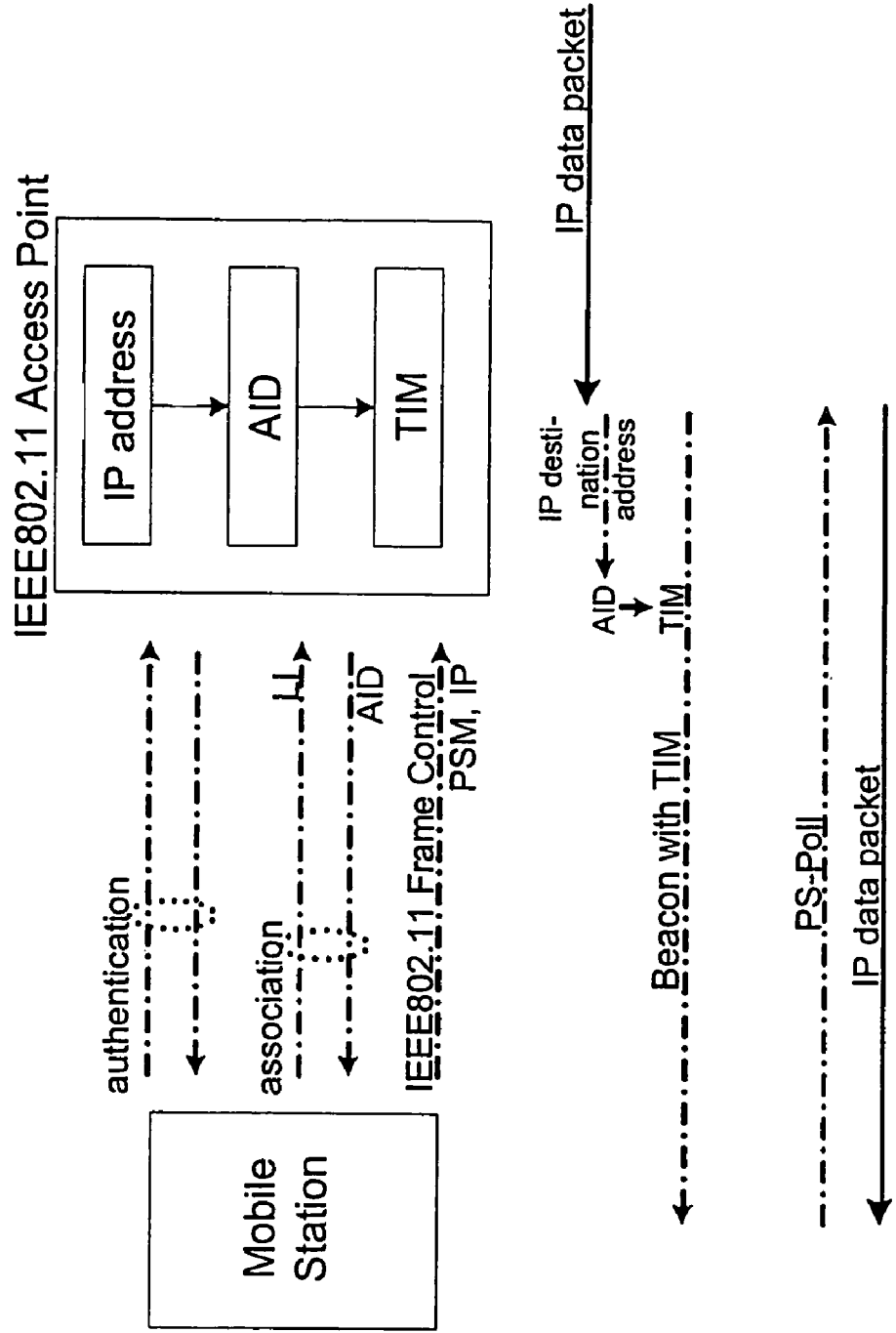
FIG. 1 is a block diagram showing schematically the standard association process as well as the indication of data traffic according to the IEEE802.11 standard.

FIG. 1 illustrates the standard procedure of authentication and association of a mobile station with an access point, as well as the communication between the station and the access point when the station enters power save mode.

After authentication is done, the mobile station sends an association request message to the access point. Together with the request message, a Listen Interval parameter (LI) is sent showing to the access point the number of beacon intervals (BI) during which the mobile station cannot receive any beacons due to its power save mode. The basic mechanism of the power save mode according to the IEEE802.11 standard is that the station reduces its interface activity during the Listen Interval in order to save energy resources. Between two Listen Intervals the station shortly enters active mode in which it is able to receive and process a beacon.

After having sent the association request message, the mobile station expects an IEEE802.11 association response message from the access point. The association response message comprises an individual association ID (AID) identifying the station when being in power save mode. The AID represents a special bit in the Traffic Indication Map (TIM) through which the mobile station is indicated that data packets destined for it are available. The TIM is a bitmap which is transmitted along with periodically advertised beacons.

In case there are IP data packets destined for a mobile station in power save mode buffered at the access point, the access point sets in the beacons sent that bit corresponding to the respective AID of the station in the TIM from 0 to 1, wherein the mobile station is able to receive a beacon after LI beacon intervals at the latest. Due to the respective bit in the TIM set to 1, the mobile station is informed that there are IP packets destined for it to be polled from the access point. By a specific control message, a so-called power save poll (PS poll), the mobile station polls the IP data packets packet-by-packet from the access point.

In order to detect and forward correctly IP packets that are destined for a specific mobile station in PSM, the access point has to know the IP address of the mobile station. As soon as a mobile station which is associated with an access point intends to enter power save mode, it sends a message to the access point, where the so-called power management flag is set in the IEEE802.11 frame control field of the MAC header. By this frame control message, the access point is not only indicated the PSM of the station, but it also learns at the same time the IP address of the mobile station due to an IP packet transmitted with the frame control message.

Figure 2:
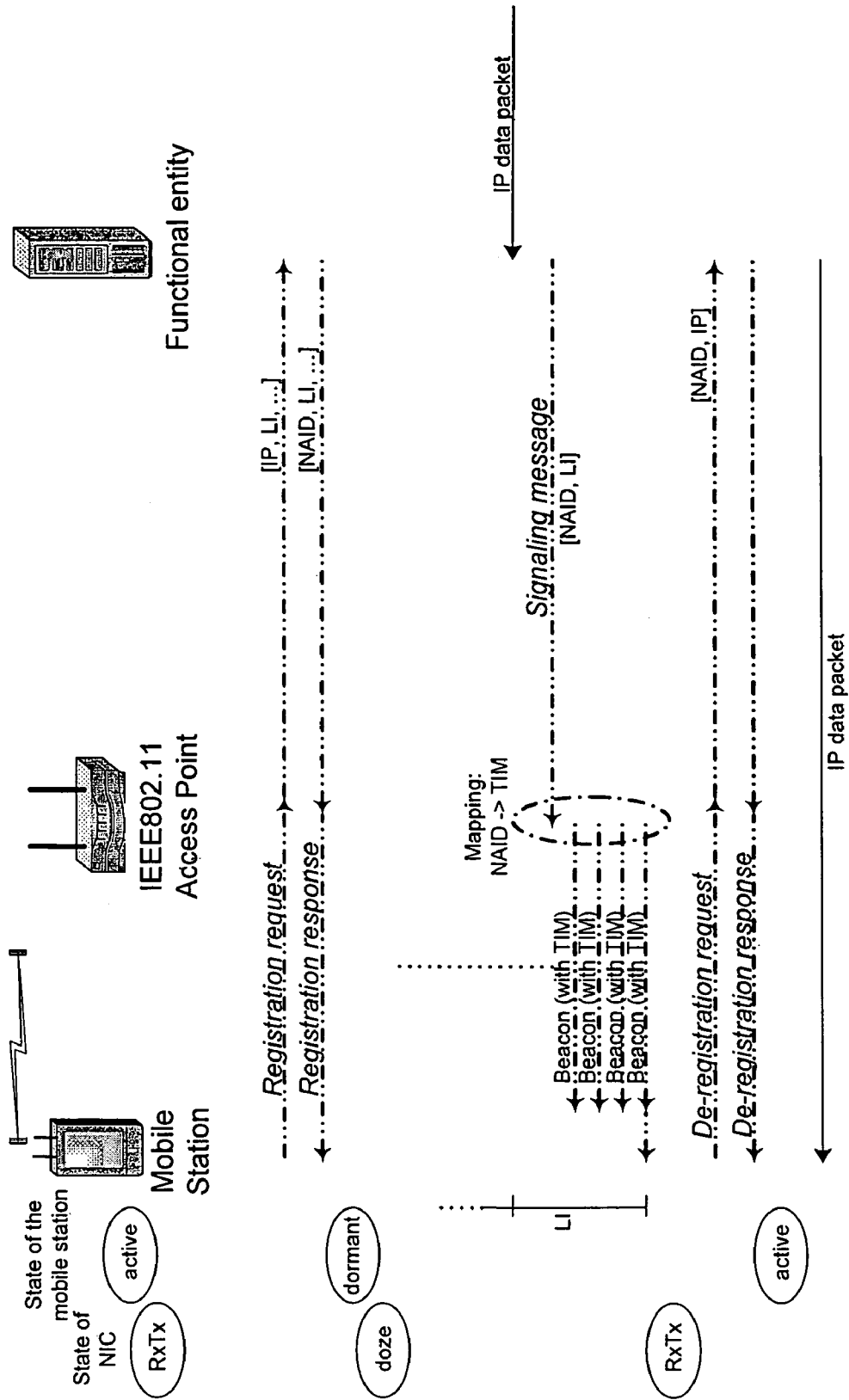
FIG. 2 is a block diagram showing schematically an example of an embodiment of the method according to the invention for controlling the communication with a mobile station within a network.

FIG. 2 shows schematically in a diagram the example of an embodiment of a method according to the invention. In addition to one (or more) access points with which the mobile stations are associated, the network comprises a functional entity which is for example collocated with an access router. The communication between the functional entity and the access points, which are represented by only one for reasons of clarity, takes place on the IP layer (layer 3) or on the protocol layers and transport mechanisms lying above, whereas the mobile station is connected to the access point by a wireless link (layer 2).

During a registration phase the mobile station transmits its IP address to the functional entity and—optionally—its Listen Interval. In the framework of a registration reply the functional entity informs the mobile station about an identification assigned to it wherein the identification is valid in the whole network irrespective of the corresponding access point. In the following, this identification is referred to as network association ID (NAID), for so as to distinguish it from the association ID (AID) according to the IEEE802.11 standard. The mobile station is hence not associated with a specific access point, but with a functional entity. Over and above individual access points, the functional entity maintains all the information relevant for PSM in the whole network or in an expanded part of the network (for example a location area). Hence, for the IEEE802.11 access points, there is no need to know PSM-related states and IP addresses of associated mobile stations.

After the registration phase the mobile station enters power save mode which means in detail that the station does not maintain any IP routing states within the network. In other words, the station enters a so-called dormant state and sets its network interface card (NIC) from receive/transmit-mode (Rx, Tx) to a so-called doze-mode in order to save bandwidth and energy resources by this means.

In case IP data packets have to be forwarded to registered mobile stations in power save mode, the functional entity, which is the connector between the IP address of a mobile station and the corresponding NAID, sends a control message to all the access points of the network or the corresponding location area respectively. The control message contains the NAID of the mobile station and—optionally—the LI parameter of the mobile station. The individual access points in the network receive the NAID and—if applicable—the optional LI parameter and set—according to the NAID—the corresponding bit in the TIM, which is sent along with the periodically advertised beacons.

The number of beacons in which the bit in the TIM is kept set, before a reset mechanism takes place, can freely be configured by the administrator. As IP data packets for mobile stations are not buffered at the access points, the importance of the LI parameters is—compared to the method according to IEEE802.11 standard—reduced. Nevertheless, the parameter can still be used to indicate to the access point how many repetitions of the specific bit set in the TIM are required. If a station is for example not able to receive any beacons for N Listen Intervals—with N=[1, 2, 3, . . .]—then the renewal and re-transmission can be coordinated by the functional entity with a timeout-mechanism.

After the NIC of a mobile station has been indicated by the TIM that there is data traffic for the station, the station re-activates itself and by doing so, sets its NIC state from "doze" to "Rx, Tx". The station then informs the functional entity via a deregistration procedure about its current location.

This information allows the re-establishment of IP routing states and the consequent forwarding of buffered IP data packets to the mobile station.

Figure 3:
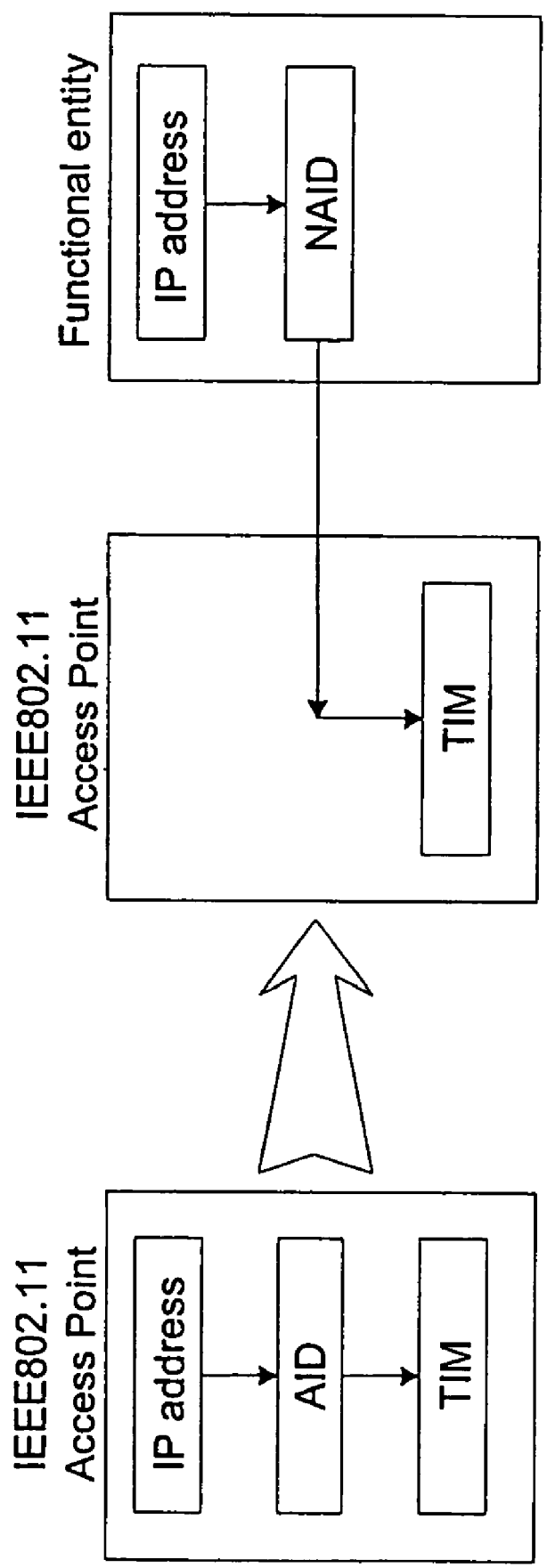
FIG. 3 is a diagram showing schematically the differences between the standard procedure according to FIG. 1 and the example of an embodiment of a method according to the invention according to FIG. 2.

FIG. 3 now illustrates in a schematic diagram the differences between the standard method according to FIG. 1 and the example of an embodiment of a method according to the invention as described in the context of FIG. 2. In the standard method, which is represented on the left side of the figure, the whole PSM-relevant functionality is collocated with the access point(s). The access point assigns an AID to the mobile stations in PSM and takes over the mapping between the IP addresses of the mobile stations and the assigned AIDs. In case there are IP data packets for the mobile station buffered at the access point, the access point sets the bit corresponding to the respective AID in the TIM. The TIM is advertised by the access point periodically along with the beacons.

In the right part of FIG. 3 the example of an embodiment of the method according to the inventions is put into contrast with the standard approach. It can be seen that a part of the PSM-relevant functionality is taken away from the access point and assigned to a functional entity which is separate from the access point. In practice, the functions taken over by the functional entity can physically be implemented on several different network components. The functional entity assigns the mobile stations in PSM a NAID which is valid in the whole network or at least in a larger part of the network, independently from individual access points. Furthermore, the functional entity is responsible for the mapping between the IP addresses of the mobile stations and the assigned NAIDs. In case IP data packets are available for a mobile station in the network, the functional entity sends a corresponding NAID to one or more access points. These take over the mapping between the NAIDs received and the IEEE802.11-specific scheme of the traffic indication via TIM indication, wherein the TIM is advertised periodically along with beacons.

Finally, it is in particular to be pointed out that the example of an embodiment given above is chosen arbitrarily and is only meant to illustrate the teaching as according to the invention, but that it does by no means restrict the latter to the example of an embodiment.

The invention claimed is:

1. A method for controlling communication with mobile stations in a wireless network, wherein the network comprises a plurality of access points via which the mobile stations are connected to the network and wherein the mobile stations are in a power save mode, comprising:
implementing at least one functional entity in the network, the at least one functional entity controlling at least one part of a functionality required in the power save mode, and one or more functional entities are separated from the plurality of access points, thus allowing controlling a traffic indication from the network in a single or multiple IP subnets for mobile stations in the power save mode, wherein the functional entity is implemented on an access router, a mobility agent or a paging agent, the functional entity maps between IP addresses of the mobile stations and assigned network association IDs; and assigning from the functional entity to each mobile station a network association ID which is valid in a part of the network or in whole of the network to identify mobile stations beyond a scope of a single access point and IP subnet, irrespective of the mobile station's corresponding access point, wherein a configuration of the network association ID is maintained whenever the mobile station moves into a region of a new access point.

2. The method according to claim 1, wherein the functionality which is assigned to the functional entity comprises detection and/or buffering of IP packets destined to the mobile stations.

3. The method according to claim 1, wherein a TIM is advertised along with subsequent beacons.

4. The method according to claim 1, wherein a full authentication and association of the station with the access point is performed after data traffic has been indicated to the station.

5. The method according to claim 1, wherein the network association IDs have a same format as identifications used according to an IEEE 802.11 standard.

6. The method according to claim 1, wherein the network is a WLAN (Wireless Local Area Network) according to an IEEE 802.11 standard.

7. The method according to claim 1, wherein the functional entity is a connector between an IP address of the mobile station and a corresponding network association ID.

8. The method according to claim 1, wherein IP packets for the mobile stations are not buffered at the access points.

9. The method according to claim 1, wherein functions taken over by the functional entity can physically be implemented on several different network components.

10. A method for controlling communication with mobile stations in a wireless network, wherein the network comprises a plurality of access points via which the mobile stations are connected to the network and wherein the mobile stations are in a power save mode, comprising:

implementing at least one functional entity in the network, the at least one functional entity controlling at least one part of a functionality required in the power save mode, and one or more functional entities are separated from the plurality of access points, thus allowing controlling a paging indication from the network in a single or multiple IP subnets for mobile stations in the power save mode; and assigning from the functional entity to each mobile station a network association ID which is valid in a part of the network or in a whole of the network, irrespective of the corresponding access point, and when IP data packets are available for a station, wherein the functional entity is implemented on an access router, a mobility agent or a paging agent, the functional entity sends a corresponding network association ID to one or more access points, which take over the mapping between the network association ID received and the traffic indication for the station, wherein a configuration of the network association ID is maintained whenever the mobile station moves into a region of a new access point.

11. The method according to claim 10, wherein the functionality which is assigned to the functional entity comprises detection and/or buffering of IP packets destined to the mobile stations.

12. The method according to claim 10, wherein the functional entity maps IP target addresses of IP data packets destined to the stations to the corresponding network association IDs.

13. The method according to claim 1, wherein the at least one functional entity takes over mapping of IP target addresses of IP data packets addressed to the mobile stations to the respective network association IDs.

14. The method according to claim 1, wherein the at least one functional entity manages an entry for the mobile station which comprises information about an IP address as well as information about the assigned network association ID of the mobile station.

15. The method according to claim 1, wherein a specific network association ID is assigned to more than one station.

16. The method according to claim 10, wherein the at least one functional entity takes over mapping of IP target addresses of IP data packets addressed to the mobile stations to the respective network association IDs.

17. The method according to claim 10, wherein the at least one functional entity manages an entry for the mobile station which comprises information about an IP address as well as information about the assigned network association ID of the mobile station.

18. The method according to claim 10, wherein a specific network association ID is assigned to more than one station.

19. A method for controlling communication with mobile stations in a wireless network comprising a plurality of access points via which the mobile stations are connected to the network and wherein the mobile stations can enter power save mode, comprising:

implementing at least one functional entity implemented on a component of the network, the at least one functional entity controlling at least one part of a functionality required in the power save mode, and one or more functional entities are separated from the plurality of access points, thus allowing controlling a traffic indication from the network in a single or multiple IP subnets for mobile stations in the power save mode; and assigning from the functional entity to each mobile station a network association ID which is valid in a part of the network or in a whole of the network to identify mobile stations beyond a scope of a single access point and IP subnet, wherein the functional entity is implemented on an access router, a mobility agent or a paging agent, irrespective of the mobile station's corresponding access point, and the at least one functional entity maps via a traffic indication map between IP addresses of the mobile stations and assigned network association IDs, wherein a configuration of the network association ID is maintained whenever the mobile station moves into a region of a new access point.

* * * * *